US008510023B2

(12) United States Patent
Huyard et al.

(10) Patent No.: US 8,510,023 B2
(45) Date of Patent: Aug. 13, 2013

(54) METHOD OF CONTROLLING THE IGNITION OF A GASOLINE ENGINE

(75) Inventors: Olivier Huyard, Toulouse (FR); Benoit Jazeron, Léguevin (FR)

(73) Assignee: Continental Automotive France, Toulouse (FR)

( * ) Notice: Subject to any disclaimer, the term of this patent is extended or adjusted under 35 U.S.C. 154(b) by 577 days.

(21) Appl. No.: 12/740,444

(22) PCT Filed: Oct. 28, 2008

(86) PCT No.: PCT/EP2008/009087
§ 371 (c)(1),
(2), (4) Date: Jun. 23, 2010

(87) PCT Pub. No.: WO2009/056269
PCT Pub. Date: May 7, 2009

(65) Prior Publication Data
US 2010/0262354 A1 Oct. 14, 2010

(30) Foreign Application Priority Data
Oct. 30, 2007 (FR) ..................................... 07 07635

(51) Int. Cl.
*G06F 19/00* (2011.01)

(52) U.S. Cl.
USPC ....... 701/113; 123/478; 123/609; 123/406.18

(58) Field of Classification Search
USPC .................... 701/113; 123/478, 609, 406.19, 123/406.18
See application file for complete search history.

(56) References Cited

U.S. PATENT DOCUMENTS

| | | | | | |
|---|---|---|---|---|---|
| 4,922,883 | A * | 5/1990 | Iwasaki | ......................... | 123/598 |
| 5,606,958 | A * | 3/1997 | Chrintz-Gath et al. | ....... | 123/601 |
| 6,029,631 | A * | 2/2000 | Jiewertz et al. | ............... | 123/491 |
| 6,176,215 | B1 * | 1/2001 | Baur et al. | ................... | 123/295 |
| 6,736,102 | B2 * | 5/2004 | Konrad et al. | ............... | 123/295 |
| 2005/0241618 | A1 | 11/2005 | Wenzler et al. | | |

FOREIGN PATENT DOCUMENTS

| | | |
|---|---|---|
| EP | 0 280 631 | 8/1988 |
| EP | 0 881 383 | 12/1998 |

OTHER PUBLICATIONS

International Search Report dated Dec. 10, 2008, from corresponding PCT application.

* cited by examiner

*Primary Examiner* — John Kwon
(74) *Attorney, Agent, or Firm* — Young & Thompson

(57) ABSTRACT

A method of controlling the ignition of a gasoline engine having an ignition coil which generates a spark on a spark plug, whereby the instant when coil charging starts is determined for each engine cycle as a function of the angular position of the crankshaft and the rotation speed of the engine, by calculating the ratio between the crankshaft angle of rotation still to pass through before the crankshaft reaches the angular position at which the ignition spark is to be produced, and the time required to charge the coil.

10 Claims, 2 Drawing Sheets

Figure 4
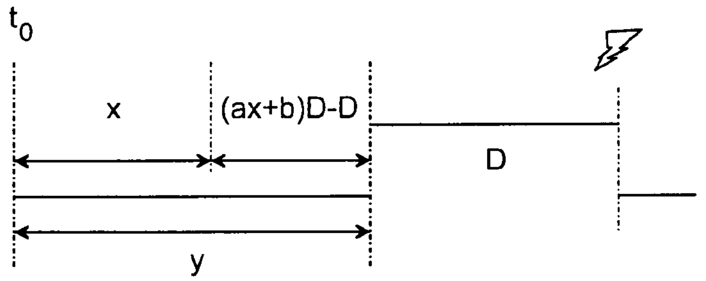
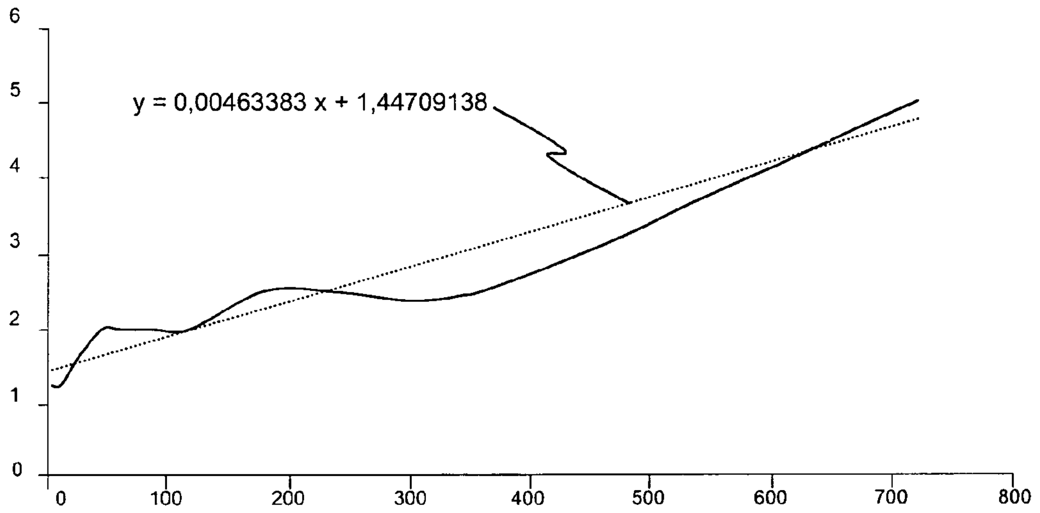
Figure 5
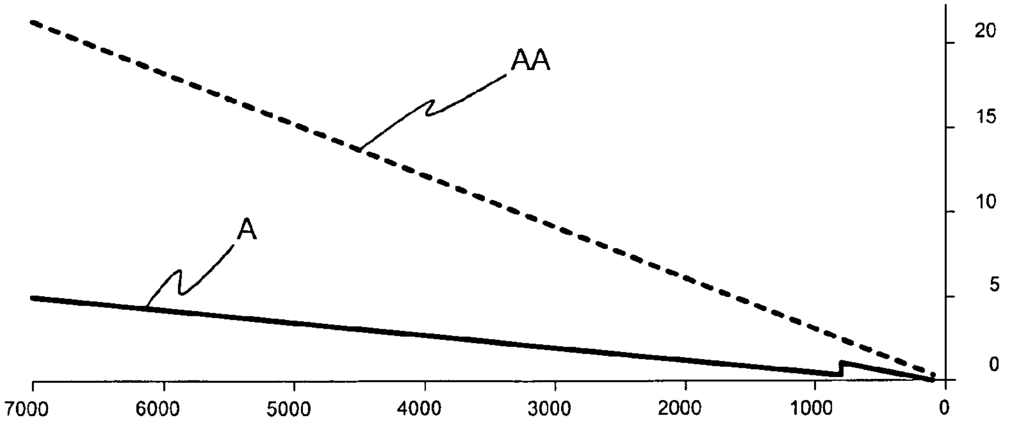
Figure 6

METHOD OF CONTROLLING THE IGNITION OF A GASOLINE ENGINE

The present invention relates to a method of controlling the ignition of a gasoline engine. It relates more particularly to the management of the charging of the ignition coil of such an engine.

It is known that the ignition coil of a controlled ignition engine must be charged for a precise predefined duration, conventionally called “coil charging time”, in order to be able to restore the accumulated energy required to produce a spark on the plug of each cylinder, and, moreover, this spark must be generated at a precise moment of the engine operating cycle, this moment being defined by an angular position of the crankshaft relative to a reference position of the latter, corresponding to the top dead center position of the cylinder. The continuous measurement of this angular position during the rotation of the engine is commonly done by a sensor which detects the passage, in its proximity, of the teeth of a toothed ring gear supported by the crankshaft.

Because of the variations in the rotation speed of the engine, during accelerations and decelerations, the time taken by a predetermined fixed number of teeth to pass in front of the sensor is variable. It is therefore not possible to choose to begin the charging of the coil at a moment determined by a certain number of teeth passing in front of the sensor before the piston is at top dead center, or any other angular position reference of the crankshaft, since then the coil charging time would be variable as a function of the rotation speed of the engine, in particular this time would be greatly reduced at high speed, which would adversely affect the operation of the engine.

Furthermore, the moment at which the spark is to be generated is dependent on various engine operating parameters, such as its speed but also its temperature or its load for example and, as indicated hereinabove, this instant should be precisely defined as a function of the angular position of the crankshaft. This instant thus defines an ignition advance, measured by an angle value relative to top dead center.

The general problem that then arises is how to determine the instant at which the charging of the coil must begin so that, as a function of the coil charging time, which is indeed a time duration, the spark can be produced with the required energy precisely at the required moment of the engine cycle, this moment not being defined as a function of time but by an angular position of the crankshaft, which is not in a fixed ratio with time.

The diagram of FIG. 1 illustrates this variable ratio problem. The first plot represents the ignition signal, this signal becoming positive during the required coil charging time (in this case set for example at 5 ms) before the instant at which the spark must be produced, corresponding to the falling edge of this signal. The other three plots represent the signals from the crankshaft rotation sensor. Said sensor supplies a pulse each time a tooth passes in front of it, respectively at three distinct engine speeds: 3000 rpm, 1600 rpm and 1000 rpm in the example shown. At 1600 rpm, 8 teeth pass in front of the sensor during the required charging time of 5 ms. If the engine accelerates to 3000 rpm, it is then 15 teeth that pass in front of the sensor during the same time. If the engine slows to 1000 rpm, it is only 5 teeth that pass in front of the sensor during the same time.

At any instant, the speed of the engine at the moment at which the spark must be produced cannot be accurately predicted; it is therefore not possible to accurately determine in how much time the spark must be produced.

However, to be able to determine an instant at which to begin the charging of the coil, a strategy is currently used whereby, in each cycle of the engine, the charging of the coil begins as soon as the following relation is satisfied:

$$\text{Current engine angular speed} = \frac{\text{desired spark angle} - \text{current angle}}{\text{desired charging time}} \quad (1)$$

According to this strategy, the instant at which the charging of the coil begins is therefore determined for each engine cycle as a function of the angular position of the crankshaft and the rotation speed of the engine, by calculating the ratio between, on the one hand, the angle of rotation of the crankshaft still to pass through before the crankshaft reaches the angular position at which the ignition spark is to be produced and, on the other hand, the time required to charge the coil. Also, when this ratio becomes substantially equal to the measured rotation speed of the engine, the charging of the coil begins.

It can be seen that the control circuit of the ignition signal therefore continually needs the rotation speed of the engine and the angular position of the crankshaft to be able to evaluate, as a function of the desired ignition advance, whether or not it is time to start the charging of the coil.

Since the sensor can detect only the edges of the teeth of the ring gear passing in front of it, the angular position of the crankshaft can effectively be detected only on each rising or falling edge of the signal from the sensor. The information required concerning the angular position of the crankshaft and the rotation speed are therefore updated only at the moment when said edges pass in front of the sensor. The above formula (1) is therefore generally recalculated once within the time interval between the passing of two successive teeth in front of the sensor.

FIG. 2 shows those successive calculations. The bottom plot represents the ignition signal, in a manner identical to FIG. 1. The initiation of the charging time and the ignition spark can be seen therein. The top plot represents the signal from the crankshaft rotation sensor and shows (vertical arrows) the instants of calculation of the formula (1).

Charging of the coil can begin as soon as the computer provided for this purpose has determined that the above formula (1) is satisfied, and therefore generally before the sensor supplies information on the passing of the tooth following that which provoked the charge-initiating signal. In other words, as can be clearly seen in FIG. 2, if, at the moment of the current calculation, represented by the last of the vertical arrows, the planned start of charging of the coil occurs at less than one tooth period from the current angular position, then charging is programmed.

This strategy thus makes it possible to be able to start the charging of the coil as early as possible, as a function of the various engine parameters at the moment of the calculation. Typically, depending on the number of teeth on the ring gear, the calculation can be made approximately every 6 degrees of angle of rotation.

However, the calculations that are repeated very frequently, each time a tooth passes in front of the sensor, result in a high computation workload for the computer, while many of the calculations, even most of them, are practically useless. Often, the calculation is performed only every two or three teeth when the engine speed is high, for example greater than a predetermined and/or adjustable threshold. Even in such conditions, the workload of the computer remains unnecessarily high in relation to the calculation requirements actually needed to determine the instant at which charging starts.

The aim of the present invention is to solve these problems, and it aims to allow for the use of a less powerful ignition management computer without in any way reducing the effectiveness and accuracy of the management of the charging of the ignition coil. It aims even more particularly to allow for a reduction of the computation workload of the computer by reducing the necessary number of calculations carried out.

With these objectives in mind, the subject of the invention is a method of controlling the ignition of a gasoline engine, whereby a strategy as mentioned hereinabove is used. According to the invention, the method is characterized in that it comprises the following steps:

A. determining the moment—defined as angle of rotation of the engine—at which the calculation to determine the instant for the start of charging must be initiated, this moment being the angular position at which the crankshaft would be situated if it still had to pass through an angle equal to the angle corresponding to the period required to charge the coil at the maximum speed that the engine could achieve through an immediate maximum acceleration, B. initiating the calculation to determine the instant for the start of charging at the moment defined in the step A.

Thus, instead of performing a calculation each time a tooth passes in front of the sensor, or at least frequently and regularly throughout the duration of each engine cycle, unnecessary calculations are avoided in the portion of the cycle following a spark generation, and the moment at which the next calculation must be carried out is deferred by taking into account:

- on the one hand, the amount of time remaining before it is necessary to start the charging of the coil, assuming that the engine remains at the same rotation speed,
- on the other hand, the acceleration potential of the engine before the instant of ignition.

In practice, it will be understood that, in the moments following the production of a spark, it is pointless to proceed with a calculation as explained previously, since the latter will logically lead to the conclusion that it is not yet time to start the charging of the coil. It is therefore possible a priori and without risks to put off the moment of the next calculation relatively significantly, by a duration notably greater than the "tooth period" which is the time period between two successive signals corresponding to the passing of two successive teeth in front of the sensor.

However, it is thus not possible to put off this moment arbitrarily, at the risk of thus arriving, following engine speed variations, at a moment at which the time remaining to recharge the coil would be insufficient for this charge to be sufficient to supply the energy required for the spark.

FIGS. 3*a* and 3*b* illustrate the effects of a variation in engine speed rotation on the angular position of the start of charging, the top plot (FIG. 3*a*) representing the case of a deceleration, the bottom plot (FIG. 3*b*) representing the case of an acceleration.

As will be understood in light of these figures, if the engine is in a deceleration phase (FIG. 3*a*) the charging time corresponds to an angle of rotation (and therefore a number of teeth passing in front of the sensor), that reduces as the spark angle is approached. In an acceleration phase (FIG. 3*b*) the reverse occurs: the charging time corresponds to an angle of rotation that increases as the spark angle approaches.

In a deceleration phase, there is therefore no risk that the speed variation will advance the moment, defined in terms of crankshaft angle, at which the charging of the coil must begin.

However, in an acceleration phase, this moment approaches, because the necessary coil charging time, in milliseconds, in fact corresponds to a greater angle, in degrees or number of teeth. It will thus be understood that, to ensure that there is no risk that a calculation for determining the moment at which the charging of the coil starts is done too late to ensure a correct charging of the coil, the invention provides for the maximum acceleration that the engine is capable of to be taken into consideration in determining, in each calculation, the moment at which the next calculation must be carried out. According to the invention, the moment of the next calculation is in fact determined so that it is before the ultimate moment at which the coil charging should begin, assuming that the engine is effectively brought to its maximum acceleration just after the current calculation. This makes it certain, since the engine can never arrive at the predetermined moment for the next calculation, at a speed greater than that permitted by its maximum acceleration, that the time remaining at said predetermined moment will be sufficient to perform a complete charging of the coil, and without there having been any need to make regular and frequent calculations throughout the duration of the engine cycle. The workload of the computer can thus be greatly reduced by comparison to the prior art strategy.

In a preferred embodiment, the maximum acceleration is determined from an experimental reading indicating the possible speed variations of the engine as a function of the rotation speed of the engine and of the angle passed through by the engine from the current angular position of the crankshaft at which a position measurement is performed until the next.

Advantageously, the variation in rotation speed is approximated by n linear functions for n given engine speed ranges.

In a particular embodiment detailed in the present invention, two engine speed ranges are retained, one at low speed (less than 800 rpm) and the other at higher speeds. When the engine is at low speed, the variation in rotation speed is advantageously approximated by a linear function of the type $y=a_1x+b$, in which the parameters $a_1$ and b are determined by linear regression from the experimental reading. When the engine is at high speed, the moment of the next calculation is determined by applying a coefficient $a_2$ to the current angular charging distance, and by applying the duly obtained new value in determining the instant at which charging begins.

In an embodiment in which the angular position of the engine is determined each time a tooth of a ring gear linked to the crankshaft passes in front of a sensor, if the position calculated at the moment of the next calculation is situated at more than one tooth into the future, then the next calculation is effectively programmed on that position, and if the calculated position of the moment of the next calculation is situated at less than one tooth into the future then the next calculation is programmed for when the next first tooth passes if the engine is at low speed or for when the next second tooth passes if the engine is at high speed.

Other features and benefits of the invention will become apparent from the following description of an exemplary implementation.

Reference should be made to the appended drawings in which.

Figure 1:
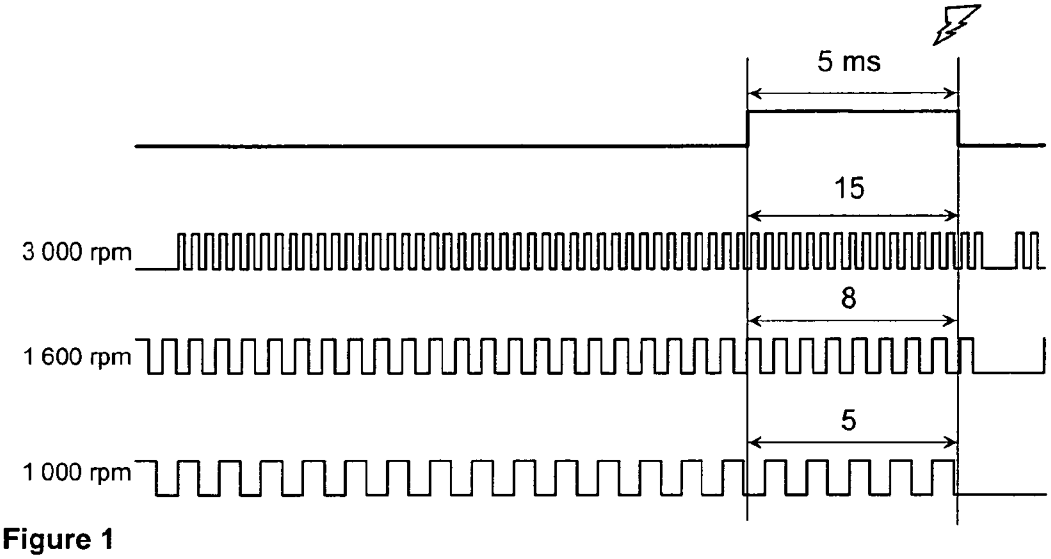
FIG. 1 illustrates this varible ration problem.
Figure 2:
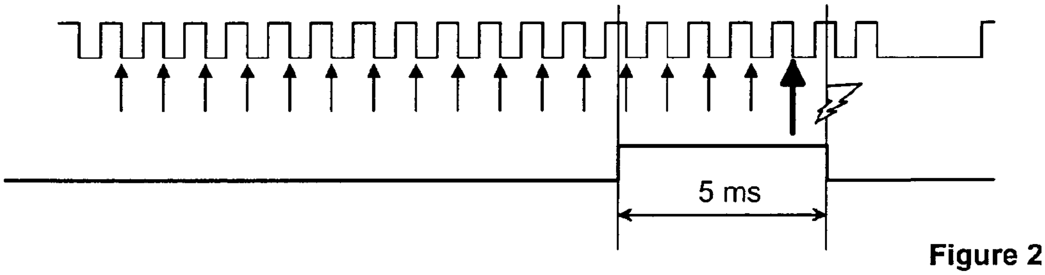
FIG 2 shows those successive calculations.
Figure 3A:
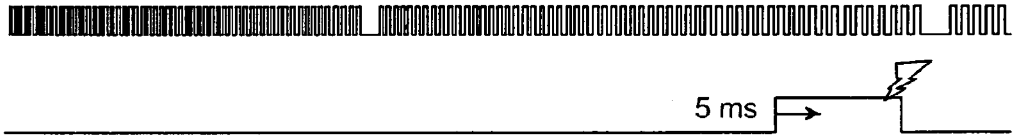
Figure 3B:
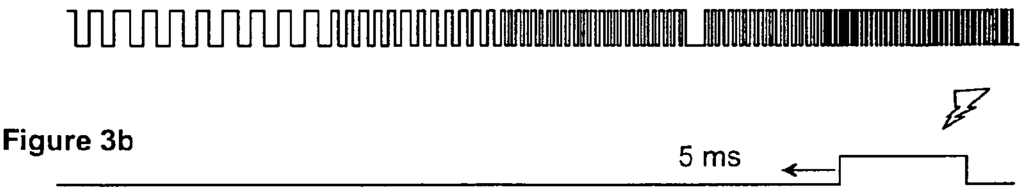

FIGS 3*a* and 3*b* illustrate the effects of a variation in engine speed rotation on the angular position of the start of charging.

FIG. 4 illustrates the algorithm used according to the invention,

FIG. 5 is a graph representing the variation of the tooth period as a function of the angle between two calculation moments, FIG. 6 illustrates the comparative results obtained by implementing the invention, in terms of computer workload.

The invention relies notably on taking into account the acceleration capabilities of the engine at the moment of each calculation.

The maximum acceleration capability can notably be evaluated by a map or a table of experimental readings defining the acceleration capability as a function notably of the rotation speed, and of the angle passed through by the engine from the current angular position of the crankshaft at which a position measurement is performed until the next. The acceleration capability, or speed gradient of the engine, can also be defined as being the variation as a function of time of the period between two successive signals corresponding to the passing of two successive teeth in front of the sensor, also called “tooth period”.

This variation in the tooth period at maximum acceleration, as a function of the speed of the engine and of the duration for which this variation can occur, can notably be determined by tests, and represented by a table such as table 1 hereinbelow.

For operation at low speed, the variation in the tooth period, which corresponds to the variation in rotation speed, can be approximated by a linear function of the type $y=a_1x+b$, in which the parameters $a_1$ and b are determined by linear regression from test data such as that in table 1, and a representation of which is given in FIG. 5 by way of example. The x-axis represents the angle between two successive calculations (in degrees) and the y-axis represents the factor by which the tooth period decreases, between two successive calculations, in case of maximum acceleration.

Referring to FIG. 4, with x being the angular distance to the next moment of calculation and $(a_1x+b)D-D$ representing the variation in the charging angle, the following will therefore apply:

$$y = x + (a_1 x + b)D - D$$

hence $$x = \frac{y + D(1 - b)}{1 + a_1 D}$$

TABLE 1

| | | Angle in degrees between the current measurement point of the tooth period and the next | | | | | | | | | | | |
|---|---|---|---|---|---|---|---|---|---|---|---|---|---|
| | | 720 | 360 | 240 | 180 | 120 | 90 | 60 | 48 | 30 | 18 | 12 | 6 |
| Engine speed in rpm | 100 | 0.2 | 0.4 | 0.4 | 0.4 | 0.5 | 0.5 | 0.5 | 0.5 | 0.6 | 0.7 | 0.8 | 0.8 |
| | 200 | 0.4 | 0.4 | 0.4 | 0.5 | 0.5 | 0.5 | 0.5 | 0.5 | 0.6 | 0.7 | 0.8 | 0.8 |
| | 500 | 0.5 | 0.6 | 0.6 | 0.6 | 0.7 | 0.6 | 0.7 | 0.6 | 0.8 | 0.8 | 0.9 | 0.9 |
| | 800 | 0.7 | 0.8 | 0.8 | 0.8 | 0.8 | 0.8 | 0.8 | 0.8 | 0.9 | 0.9 | 0.9 | 0.9 |
| | 1000 | 0.8 | 0.8 | 0.6 | 0.9 | 0.8 | 0.9 | 0.9 | 0.9 | 0.9 | 0.9 | 0.9 | 0.9 |
| | 1500 | 0.9 | 0.8 | 0.9 | 0.9 | 0.9 | 0.9 | 0.9 | 0.9 | 0.9 | 0.9 | 0.9 | 0.9 |

The algorithm used according to the invention is illustrated in FIG. 4. At the moment $t_0$ of a determination calculation to determine whether or not the charging of the coil should be started, the angular position of the crankshaft that would correspond to the position at which the charging of the coil begins assuming that the engine is abruptly raised to a maximum acceleration is therefore calculated. This calculation uses the spark angle, or required angle of ignition advance, and the angle D of rotation of the crankshaft, which corresponds to the coil charging time at the current speed of the engine. The moment M of the next calculation is then calculated as follows:

Immediately after $t_0$, if the maximum acceleration is reached, the angular position of the crankshaft corresponding to the start of charging would be approaching. The longer the predicted moment for a next calculation is delayed, the nearer the moment of the start of charging approaches, and there is thus an instant at which these two moments will meet, and it is at that instant that the moment of the next calculation will be programmed, that moment substantially corresponding to the ultimate moment required to start the charging of the coil in the case where the maximum acceleration is immediately reached.

The determination of the possible acceleration, which is also the variation in the abovementioned tooth period, could therefore be deduced from table 1. However, to simplify the calculations and avoid causing a significant computer workload, the inventors have determined two methods depending on whether the engine is at low speed (less than approximately 800 rpm in the example), or at high speed (above 800 rpm).

This equation therefore makes it possible to calculate the distance x in angle of rotation of the crankshaft, from the current position to the moment of the next calculation, from the angular distance D corresponding to the required charging time and the angular distance y to the start of charging, these values y and D being the values considered at the time $t_0$.

For operation at higher speed, the moment of the next calculation is determined by applying a coefficient $a_2$ to the current angular distance D, and by applying the duly obtained new value in calculating the start of charging.

Once the moment of the next calculation has been determined, two possibilities are considered:

Either the duly calculated position is situated at more than one tooth into the future, in which case the next calculation is effectively programmed on that position, or the calculated position is at less than one tooth into the future. Now, since there is no speed information available throughout the duration of a tooth, programming a calculation at less than one tooth into the future is pointless. Therefore, if the engine is at low speed (which means that high acceleration is possible), the next calculation is programmed during the passing of the first next tooth. If the engine is at high speed (which means that no high acceleration can be envisaged), the next calculation is programmed during the passing of the second next tooth. As an example, implementing the invention on a four-cylinder engine has made it possible to obtain, in terms of performance measured by the saving in computer workload, the results illustrated in table 2 below and in FIG. 6, in comparison to the use of the prior art algorithm.

TABLE 2

| | Maximum spark angle angular error | Maximum charging time error | Maximum computer workload |
|---|---|---|---|
| Prior art algorithm | 0.15° | 8.6% | 22% |
| Inventive algorithm | 0.15° | 18% | 5% |

FIG. 6 represents the comparison of the percentage workload of the computer (y-axis), as a function of engine speed (x-axis) for an algorithm according to the invention (A) and a prior art algorithm (AA).

Such performance gains make it possible either to reduce the computer workload or use a less powerful, and therefore less costly computer without adversely affecting overall performance.

The invention can easily be extended to more than two speed ranges (case illustrated previously). Thus, if n engine speed ranges can be associated with n linear functions, then it is possible to use an approximation of the variation in rotation speed that is most appropriate as a function of the current engine speed range of the engine. The choice of the moment M of the calculation to determine the instant at which charging starts can then be optimized and the computer workload further reduced.

The invention claimed is:

1. A method of controlling the ignition of a gasoline engine comprising an ignition coil which generates a spark on a spark plug, whereby the instant when coil charging starts is determined for each engine cycle as a function of the angular position of the crankshaft and the rotation speed of the engine, by calculating the ratio between the crankshaft angle of rotation still to pass through before the crankshaft reaches the angular position at which the ignition spark is to be produced, and the time required to charge the coil, and, when this ratio becomes substantially equal to the measured rotation speed of the engine, the charging of the coil begins, characterized in that said method comprises the following steps:

A. determining a moment M defined as angle of rotation of the engine at which the calculation to determine the instant for the start of charging must be initiated, this moment being the angular position at which the crankshaft is situated when it still has to pass through an angle equal to an angle D corresponding to the period required to charge the coil at the maximum speed that the engine could achieve through an immediate maximum acceleration, B. initiating the calculation to determine the instant for the start of charging at the moment M defined in the step A.

2. The method as claimed in claim 1, characterized in that the maximum acceleration is determined from an experimental reading indicating the possible speed variations of the engine as a function of the rotation speed of the engine and of the angle passed through by the engine from the current angular position of the crankshaft at which a position measurement is performed until the next.

3. The method as claimed in claim 2, characterized in that the variation in rotation speed is approximated by n linear functions for n given engine speed ranges.

4. The method as claimed in claim 3, characterized in that n =2.

5. The method as claimed in claim 4, characterized in that, when the engine is at low speed, the variation in rotation speed is approximated by a linear function of the type $y = a_i x + b$, in which the parameters $a_i$ and b are determined by linear regression from the experimental reading.

6. The method as claimed in claim 5, characterized in that it is applied for a rotation speed of the engine of less than 800 rpm.

7. The method as claimed in claim 4, characterized in that, when the engine is at high speed, the moment of the next calculation is determined by applying a coefficient ($a_2$) to the current angular charging distance (D), and by applying the duly obtained new value in determining the instant at which charging begins.

8. The method as claimed in claim 7, characterized in that it is applied for a rotation speed of the engine greater than 800 rpm.

9. The method as claimed in claim 5, characterized in that, the angular position of the engine being determined each time a tooth of a ring gear linked to the crankshaft passes in front of a sensor, if the position calculated at the moment of the next calculation is situated at more than one tooth into the future, then the next calculation is effectively programmed on that position, and if the calculated position of the moment of the next calculation is situated at less than one tooth into the future then the next calculation is programmed for when the next first tooth passes if the engine is at low speed or for when the next second tooth passes if the engine is at high speed.

10. The method as claimed in claim 7, characterized in that, the angular position of the engine being determined each time a tooth of a ring gear linked to the crankshaft passes in front of a sensor, if the position calculated at the moment of the next calculation is situated at more than one tooth into the future, then the next calculation is effectively programmed on that position, and if the calculated position of the moment of the next calculation is situated at less than one tooth into the future then the next calculation is programmed for when the next first tooth passes if the engine is at low speed or for when the next second tooth passes if the engine is at high speed.

* * * * *

UNITED STATES PATENT AND TRADEMARK OFFICE

CERTIFICATE OF CORRECTION

PATENT NO. : 8,510,023 B2
APPLICATION NO. : 12/740444
DATED : August 13, 2013
INVENTOR(S) : Huyard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this
Fifteenth Day of September, 2015

Michelle K. Lee
*Director of the United States Patent and Trademark Office*